(12) United States Patent
Eichele et al.

(10) Patent No.: US 6,772,926 B2
(45) Date of Patent: Aug. 10, 2004

(54) RETRACTABLE VEHICLE ROOF MOUNTED CARRIER

(76) Inventors: William R. Eichele, 11440 Woodiebrook Rd., Chardon, OH (US) 44024; Ronald Kurtz, 901 Red Tree La., St. Peters, MO (US) 63376

( * ) Notice: Subject to any disclaimer, the term of this patent is extended or adjusted under 35 U.S.C. 154(b) by 0 days.

(21) Appl. No.: 10/204,125
(22) PCT Filed: Feb. 23, 2001
(86) PCT No.: PCT/US01/05751
§ 371 (c)(1), (2), (4) Date: Oct. 18, 2002
(87) PCT Pub. No.: WO01/62549
PCT Pub. Date: Aug. 30, 2001

(65) Prior Publication Data
US 2003/0205598 A1 Nov. 6, 2003

Related U.S. Application Data
(60) Provisional application No. 60/185,075, filed on Feb. 25, 2000.

(51) Int. Cl.[7] .................................................. B60R 9/05
(52) U.S. Cl. .................. 224/316; 224/318; 224/320; 224/328; 224/572
(58) Field of Search .................. 224/316, 318, 224/319, 320, 328, 572

(56) References Cited

U.S. PATENT DOCUMENTS

| | | | | |
|---|---|---|---|---|
| 2,196,341 A | * | 4/1940 | Rush | 224/318 |
| 2,914,231 A | * | 11/1959 | Hornke | 224/316 |
| 3,000,419 A | * | 9/1961 | Morrison | 224/318 |
| 3,146,018 A | | 8/1964 | Pearlman | |
| 4,101,062 A | | 7/1978 | Lazar | |
| 4,867,361 A | | 9/1989 | Burnham | |
| 5,096,107 A | * | 3/1992 | VanSon | 224/328 |
| 5,423,588 A | * | 6/1995 | Eglinton | 296/98 |
| 5,462,329 A | | 10/1995 | Cheng | |
| 5,538,169 A | * | 7/1996 | Moore | 224/328 |
| 5,762,393 A | | 6/1998 | Darmas, Sr. | |
| 5,775,765 A | | 7/1998 | Kintz | |
| 5,996,867 A | * | 12/1999 | Burgess et al. | 224/316 |
| 6,244,482 B1 | * | 6/2001 | Gyarmaty | 224/318 |
| 6,257,470 B1 | * | 7/2001 | Schaefer | 224/318 |

* cited by examiner

Primary Examiner—Stephen K. Cronin
(74) Attorney, Agent, or Firm—Calfee, Halter & Griswold

(57) ABSTRACT

A retractable carrier system (10) is provided for carrying luggage and other objects on the roof of a vehicle. The carrier system (10), which may be original equipment on the vehicle or an after market addition, includes a collapsible container (20), a reel (50) onto which the collapsible container (20) may be rolled and a storage compartment (70).

17 Claims, 4 Drawing Sheets

RETRACTABLE VEHICLE ROOF MOUNTED CARRIER

This application claims the benefit of Provisional application No. 60/185,075 filed Feb. 25, 2001.

FIELD OF THE INVENTION

This invention generally relates to carriers of luggage and other objects and more specifically to a collapsible container or pouch which may be mounted on the roof of an automobile or other vehicle. The container is preferably attached to and may be rolled up on a reel which is housed within a storage compartment.

BACKGROUND OF THE INVENTION

Automobile roof carriers are used to store objects in transportation when storage space within the vehicle is not available or appropriate. Examples of when roof carriers are useful include: vacation traveling, instances when interior space is taken by passengers or pets, the transport of dirty or odorous materials, in compact cars where interior space is limited, and in instances when the vehicle owner unexpectedly has a need to store extra materials he had not originally planned on hauling.

Many types of roof carriers have been developed to transport luggage and other objects. Some are hard plastic preformed cases which attach to the luggage rack of the automobile. One disadvantage of these carriers is that they are bulky and require extensive room for storage. Due to their size, these carriers are not, or cannot be, stored within or upon the vehicle when not in use. Thus, when there is an unexpected need for rooftop storage, these rooftop carriers are often not available. A second disadvantage is that it is time consuming to mount and dismount these carriers. Finally, because these carriers are pre-shaped, space utilization is limited.

Another prior art approach to roof storage is a retractable web which acts as a cover to objects already placed upon the luggage rack or roof of an automobile. This approach is often not desirable because the web does not fully enclose the objects, thus they are not completely protected from rain, wind or snow. Also, the roof of the automobile is not protected from dents and scratches caused by the objects shifting during transport.

Another approach to roof storage is a fully detachable soft shelled container. Although this container may be quickly installed or detached, it cannot be retracted into a storage area on the automobile roof. Instead, it is completely removed and may become damaged, soiled, lost or stolen.

A retractable roof top carrier which may be discretely stored on an automobile roof, will bold differently shaped objects and will completely protect objects from exposure to the elements is desired.

SUMMARY OF THE INVENTION

The present invention overcomes disadvantages in the prior art by providing an improved carrier. The invention provides in one aspect, a retractable carrier for holding objects on the roof of a vehicle comprising a collapsible container having interior access, which is formed by one or more flexible webs, a storage compartment which is attached to the vehicle roof and used to hold the container when it is collapsed, and means to secure the container to the roof of the vehicle when it is extended from the storage compartment.

The invention provides in another aspect a retractable carrier for holding objects on the roof of a vehicle comprising a collapsible container having interior access, which is formed by one or more flexible webs, a storage compartment which is integrally manufactured as part of the vehicle roof and used to hold the container when it is collapsed, and means to secure the container to the roof of the vehicle when it is extended from the storage compartment.

These and other aspects of the invention are herein described in particularized detail with reference to the accompanying Figures.

DETAILED DESCRIPTION OF PREFERRED AND ALTERNATE EMBODIMENTS

Figure 1:
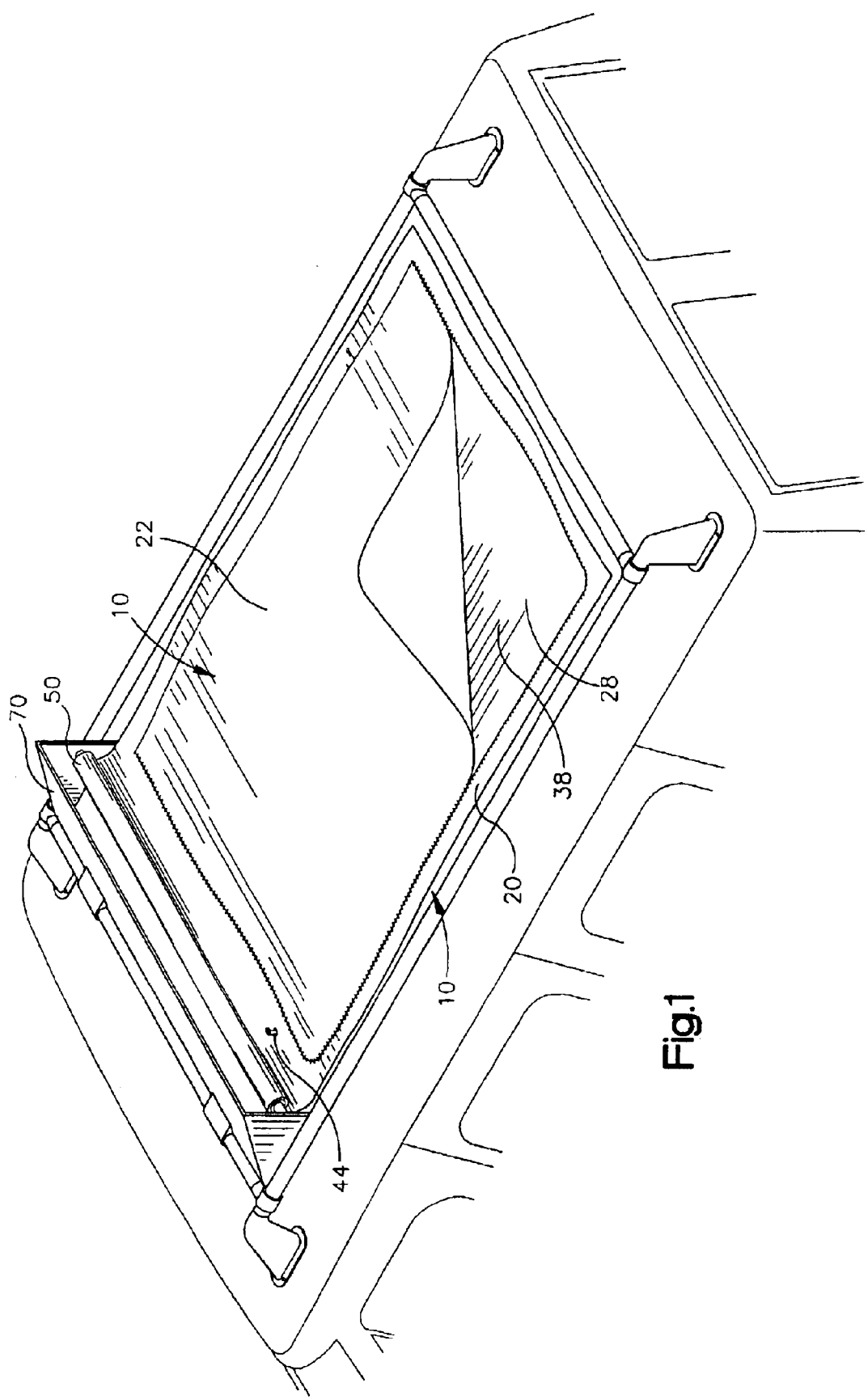
FIG. 1 is a perspective view of the carrier with the collapsible container having upper and lower webs.

Referring to the drawings, FIG. 1 illustrates a preferred roof mounted carrier, generally referenced as 10, according to the invention. The carrier, as described in more detail below, comprises a collapsible container 20, a reel 50 onto which the collapsible container 20 may be rolled, and a storage compartment 70.

Figure 2:
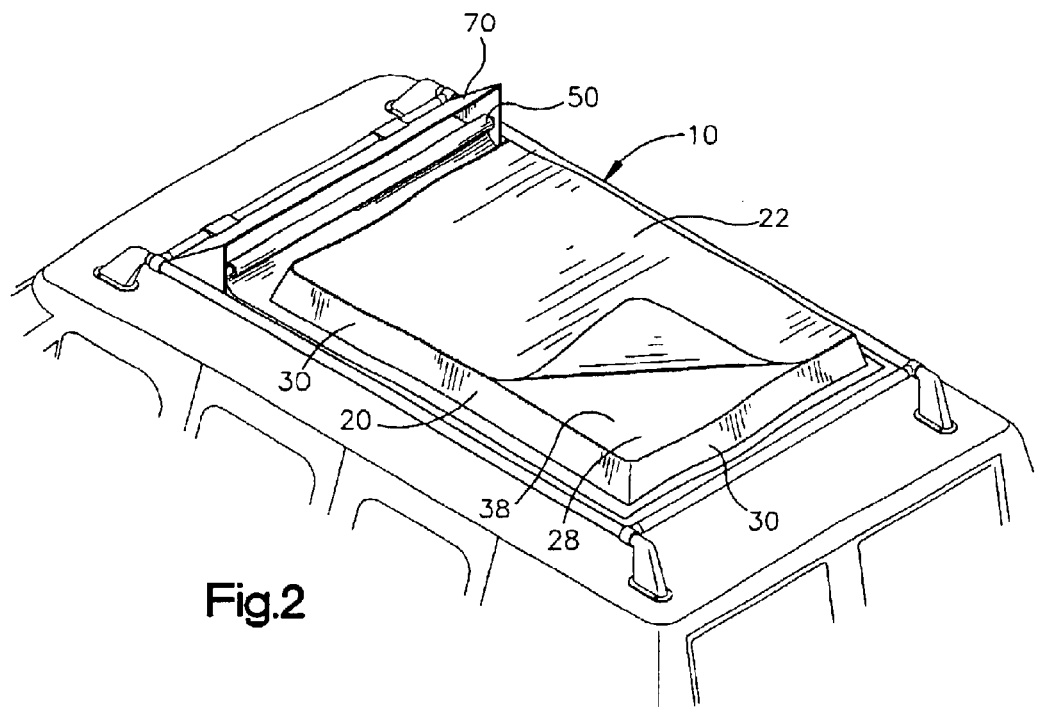
FIG. 2 is a perspective view of the carrier with the collapsible container having upper, lower, and side webs.

FIG. 1 shows the collapsible container 20. The collapsible container 20 is preferably sized to cover the entire area of the vehicle's luggage rack when fully unrolled, but may be a smaller size. Collapsible container 20 is made of at least one web of material which may be folded to form an upper web 22 and a lower web 28. The upper web 22 and lower web 28 may also initially be separate pieces. The upper web 22 and lower web 28 are joined, preferably by stitching, along a seam to create the collapsible container 20. In an alternate embodiment shown in FIG. 2, separate side webs 30 are placed between the upper web 22 and the lower web 28 and are attached along seams to the upper web 22 and the lower web 28, preferably by stitching. The upper web 22 and side webs 30 are air permeable and are preferably made of a fabric upon which is laminated a membrane comprised of a polytetrafluoroethylene polymer and an oleophobic polymer. GORETEX® is an example of such a laminated fabric. Alternatively, the upper web 22 and side webs 30 may be made of any material which is waterproof, strong, and which may be rolled into a tube having a small diameter. The lower web 28 is preferably made of neoprene, but may be any material which is not air permeable. Preferably, part or all of the seam between the upper web 22 and lower web 28 or the upper web 22 and the side webs 30 is equipped with a zipper allowing access into the chamber 38 of the collapsible container 20. Instead of a zipper, other attachment means may be used such as two part cloth adhering strip systems or other means known to those skilled in the art. In an alternate embodiment of the invention where the upper web is cut to form a flap 42 shown in FIG. 3, access to the chamber 38 is allowed by opening the flap 42. Flap 42 may be closed using a zipper or other means known to those skilled in the art.

Figure 3:
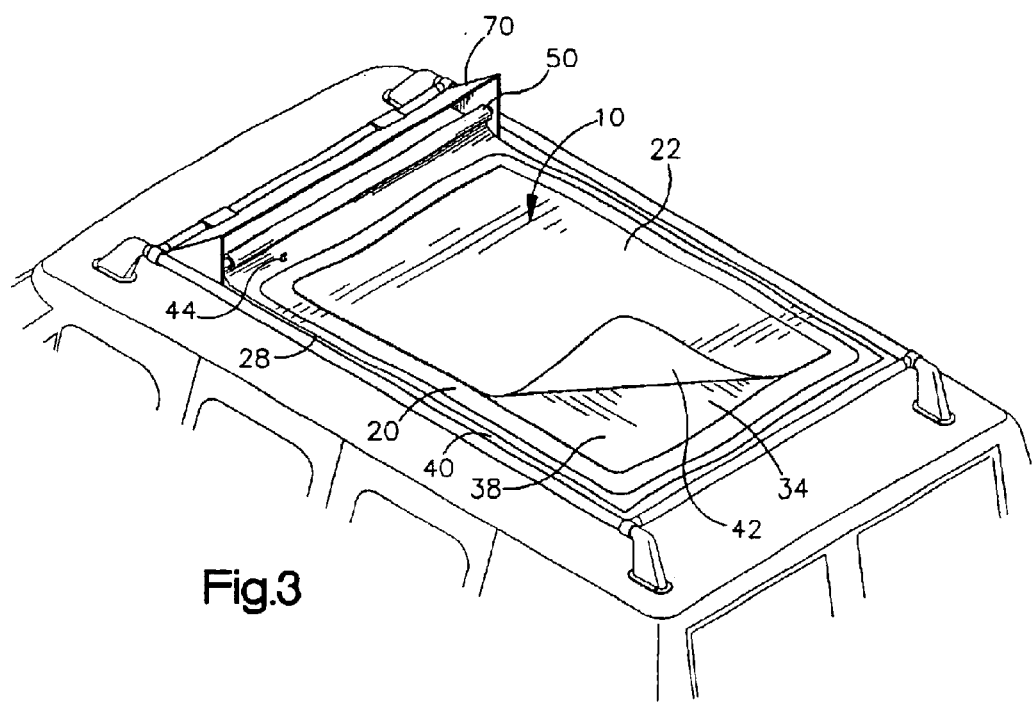
FIG. 3 is a perspective view of the carrier with the collapsible container having a flap as part of upper web.

In an alternate embodiment, shown in FIG. 3, an interior web 34 is added to the collapsible container 20. Interior web 34 is preferably made of neoprene, but may be any material which is not air permeable. Interior web 34 is fully attached to either upper web 22 or lower web 28 creating a narrow sub-chamber 40 between the interior web 34 and the lower web 28. Preferably, the seal between the interior web 34 and the lower web 28 or upper web 22 is airtight and an air valve 44 is attached to either the interior web 34 or lower web 28 to allow air to be introduced into the sub-chamber 40. Sub-chamber 40 may be inflated using a manual pump, an air compressor or other means known to those skilled in the art. The inflated sub-chamber 40 creates a cushion to protect the roof of the vehicle from the weight and motion of the stored objects, as well as the objects themselves. Alternatively, the seal between the interior web 34 and lower web 28 or upper web 22 need not be airtight, the material from which the lower web 28 and interior web 34 is formed may be air permeable, and thin compressible padding is installed within the sub-chamber 40 to provide cushioning.

When not in use, the collapsible container 20 may be retracted into a roll by being wound about a reel 50. The reel 50 is an elongate round tube or solid to which one end of the collapsible container 20 is attached. The reel 50 is equipped with a hand crank 54 or motor 56 (not shown) which allows rotation of the reel 50. The hand crank 54 (not shown) has a handle 55 which preferably may be detached when not in use. Alternatively the handle 55 may remain attached to the reel 50 or may be retracted into the reel 50 and hidden.

Figure 4:
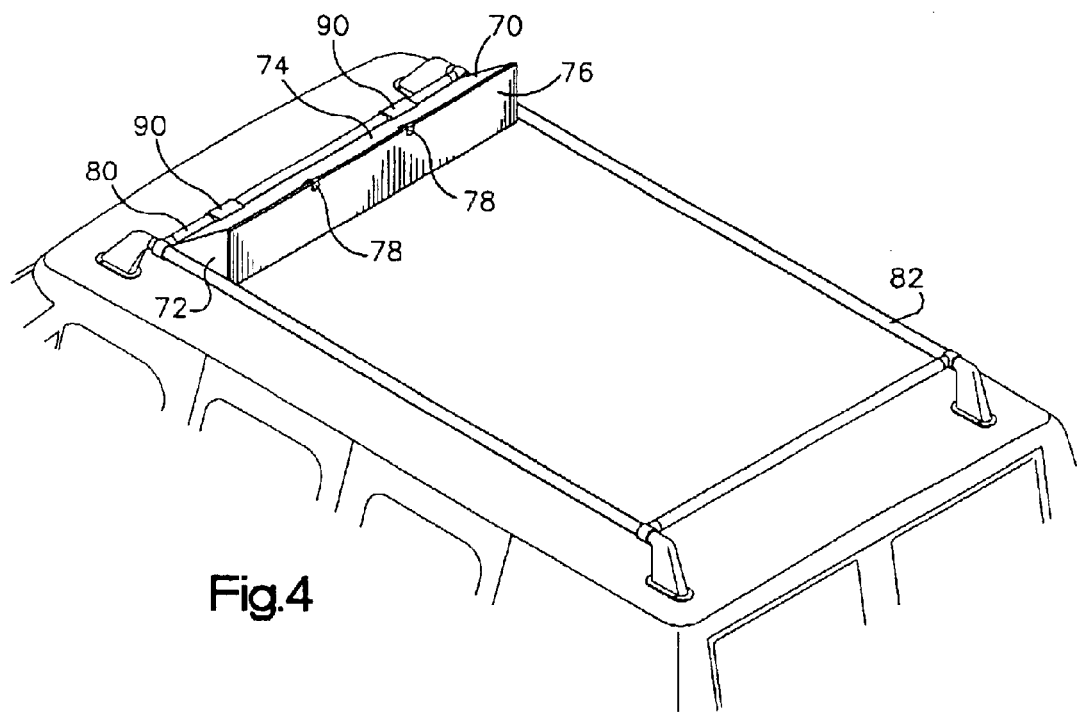
FIG. 4 is a perspective view of the carrier with the collapsible container retracted within the storage compartment.
Figure 5:
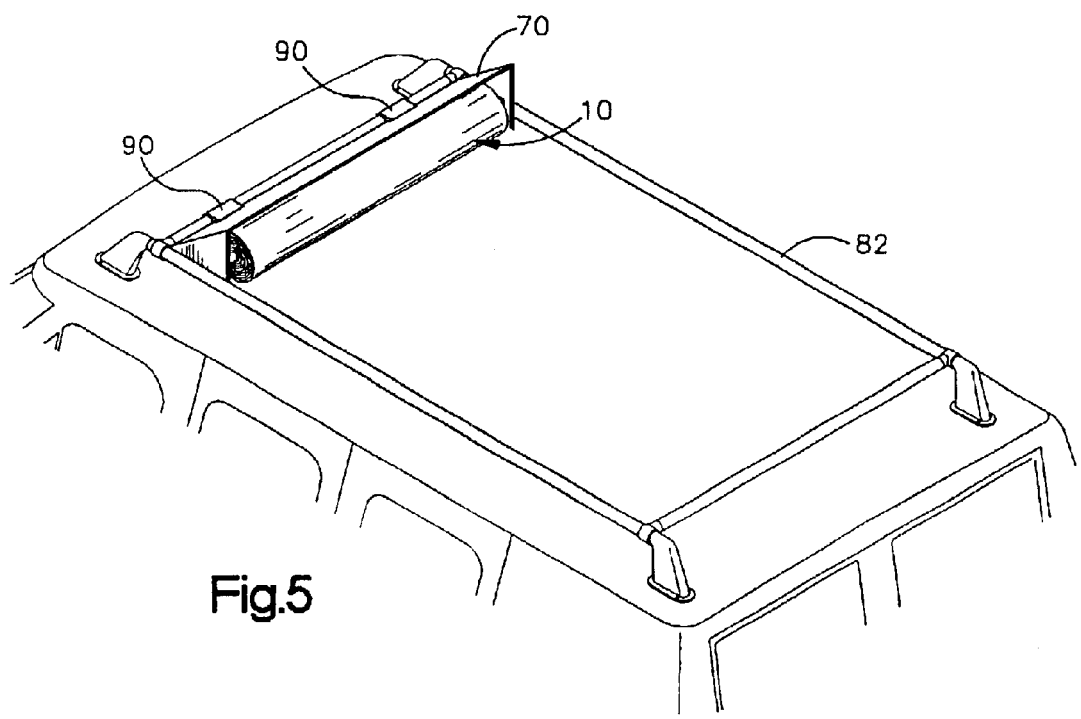
FIG. 5 is a perspective view of the carrier with the collapsible container retracted within the storage compartment and the cover plate removed from the storage compartment.

The reel 50 is mounted in a storage compartment 70 which covers and protects the collapsible container 20 when rolled about the reel 50. As shown in FIG. 4, the storage compartment 70 is a narrow compartment having a length similar to that of the reel 50 (not shown) it houses. The storage compartment 70 has a height suitable to enclose the reel 50 and rolled collapsible container 20. The storage compartment 70 has sides 72 and a leading surface 74 which faces towards the front of the vehicle. The leading surface 74 may be any shape, but is preferably shaped aerodynamically to reduce wind drag across the top of the vehicle when it is in motion. Preferably, the storage compartment 70 abuts the front cross member 80 of the luggage rack 82 of the vehicle. The storage compartment 70 has a cover plate 76 which protects the collapsible container 20 from the environment when it is not being used and is in a retracted position. Preferably the cover plate 76 is attached with hinges 78 to the storage compartment and is flipped open to allow access to the collapsible container 20. The cover plate 76 may be secured to the storage compartment 70 using fasteners 79 known to those skilled in the art when the collapsible container 20 is in use (not shown). Alternatively, the cover plate 76 may be detachable or no cover plate 76 may be used in which case the collapsible container 20 remains partially exposed in storage as shown in FIG. 5.

Figure 6:
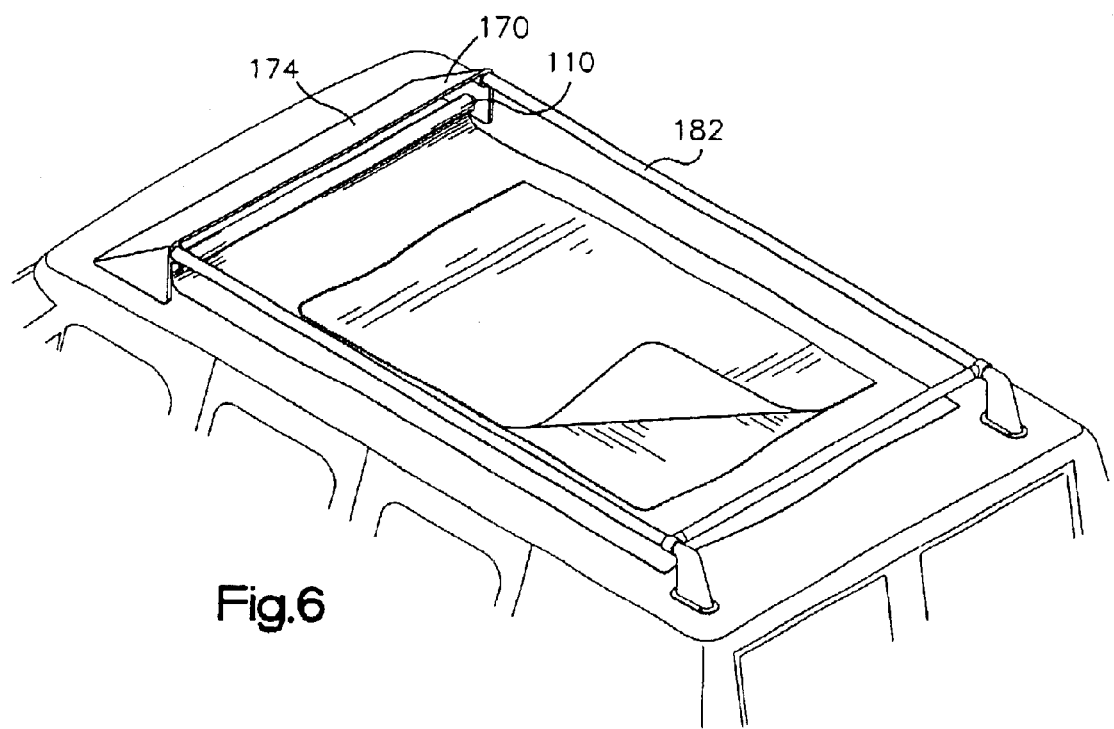
FIG. 6 is a perspective view of the carrier having a storage compartment integrally manufactured as part of the vehicle roof.

In one embodiment, typically when the roof mounted carrier 10 is sold as an aftermarket accessory, the roof mounted carrier 10 is attached to the vehicle by affixing the storage compartment 70 to the vehicle's luggage rack 82. Preferably two mechanical clamps 90 attach to both the storage compartment 70 and the luggage rack 82. Alternatively any number of clamps, screws, bolts, or other attachment means known to those skilled in the art may be used. The carrier 10 may be removed at any time when not in use, but also may permanently remain mounted whether the collapsible container 20 is in use or in storage. In yet another embodiment shown in FIG. 6, the roof mounted carrier 110 is installed by an vehicle manufacturer at the time the vehicle is made. The storage compartment 170 is integrally formed into the luggage rack 182 or roof of the vehicle (not shown). In this embodiment the aerodynamic leading surface 174 of the storage compartment 170 will be an existing part of and integrally manufactured with the luggage rack 182 or vehicle roof.

Figure 7:
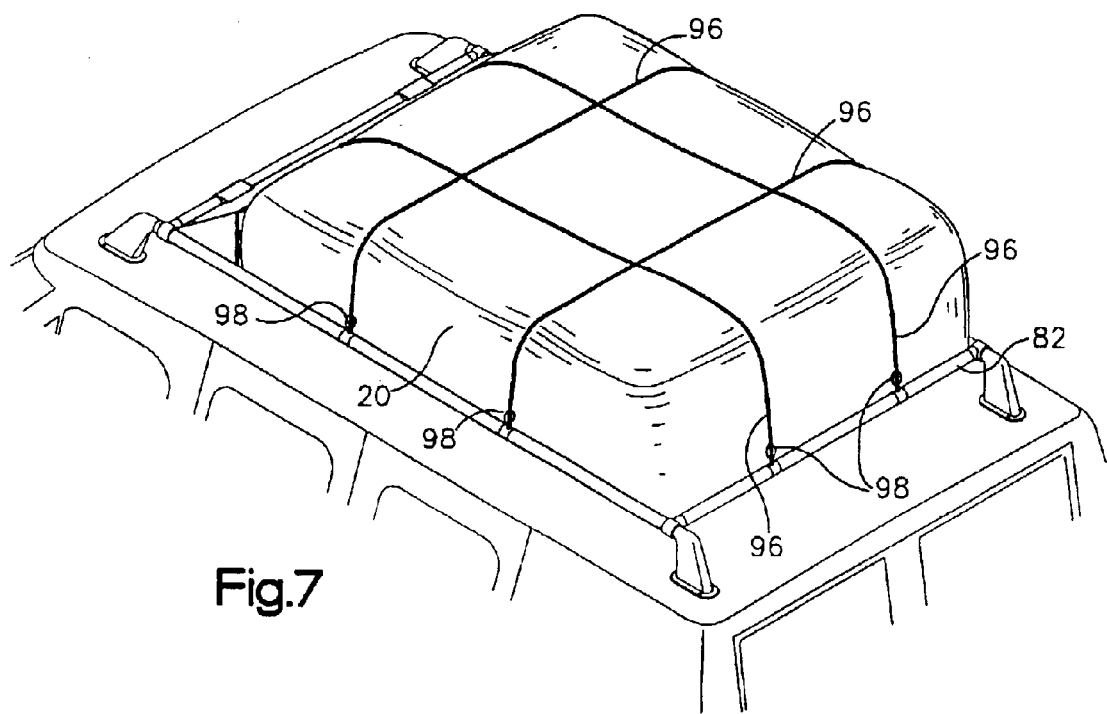
FIG. 7 is a perspective view of the carrier with the collapsible container full of objects and strapped to a vehicle.

When carrying objects the collapsible container 20 may be further secured to the luggage rack 82 using elastic or adjustable straps 96 as shown in FIG. 7. Preferably four straps 96 are used, two placed lengthwise and two based widthwise, but any number and orientation is acceptable. The straps 96 may be attached to the automobile luggage rack 82, window frame or any sturdy fixture. Alternatively, other methods of securing the loaded collapsible container 20 may be used such as rope, tape, or even other covers made of canvas, plastic or the like. Preferably, the straps 96 will pass through one or more rings 98 attached to the collapsible container 20 in order to secure the position of the container 20. Rings 98 may be made of metal or plastic. Alternatively, no rings are used and the tension of the straps 96 against the container 20 is sufficient to keep the container 20 stationary.

Referring to FIGS. 1–4, and 7 the operation of a roof mounted carrier 10 may now be described. In an embodiment utilizing a cover plate 76 on the storage compartment 70, the cover plate 76 is first flipped open or removed. The collapsible container 20 is manually unrolled from the reel 50 or unrolled using the hand crank (not shown) or motor (not shown). The interior chamber 38 is accessed when the zipper or other means holding the upper web 22 and lower web 28 together, holding the upper web 22 and side webs 30 together, or keeping flap 42 closed, is opened. In an embodiment having an interior web 34 creating an inflatable sub-chamber 40, this chamber is filled with air to create a cushion. Objects may then be loaded into the chamber 38. After objects have been loaded, the zipper or other means of attachment are closed. The collapsible container 20 is then further secured to the vehicle's luggage rack 82 by straps 96, rope or other means known to those skilled in the art. After objects are removed from the collapsible container 20, the zipper or other attachment means are closed. The collapsible container 20 is then retracted by rolling onto the reel 50. Depending on the embodiment of the invention, rolling is accomplished by manually turning a handle (not shown), or by an electric motor (not shown) attached to the reel 50. In an embodiment utilizing a cover plate 76 on the storage compartment 70, the cover plate 76 is closed and the container is protected from the environment.

Although the invention has been shown and described with reference to certain preferred and alternate embodiments including a roof mounted carrier 10 suited as an after market accessory and a carrier 110 installed by an original equipment manufacturer, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A retractable carrier for holding objects on the roof of a vehicle comprising:

a collapsible container comprising first and second flexible webs that define an interior chamber, and at least one opening that provides access to said chamber;

a storage compartment attached to the roof of said vehicle and adapted to store said container when collapsed; and means for securing said container to said roof when container is extended.

2. A carrier according to claim 1 wherein said container is collapsible by folding upon itself.

3. A carrier according to claim 1 further comprising a reel within said storage compartment, said reel being designed and adapted to roll said container within said compartment, and an end of said container being attached to said reel.

4. A carrier according to claim 1 wherein said container further includes a sub-chamber which can be filled with air.

5. A carrier according to claim 1 wherein said container further includes a sub-chamber filled with padding.

6. A carrier according to claim 1 wherein said reel further includes a handle for turning.

7. A carrier according to claim 1 comprising a motor adapted to rotate said reel.

8. A carrier according to claim 1 wherein said container has a zipper for closure of said chamber.

9. A carrier according to claim 1 further including one or more straps to secure said container to vehicle.

10. A carrier according claim 1 wherein said first flexible web is air permeable and manufactured of a fabric upon which is laminated a membrane comprised of a polytetrafluoroethylene polymer and an oleophobic polymer.

11. The carrier according to claim 1 further having mounting means attaching said storage compartment to a roof of said vehicle.

12. The carrier according to claim 1 wherein said storage compartment has an aerodynamic leading face.

13. The carrier according to claim 1 wherein said storage compartment further includes a cover plate.

14. The carrier of claim 1 manufactured separately from said vehicle and mountable to said vehicle.

15. A retractable carrier for holding objects on the roof of a vehicle comprising: a collapsible container comprising first and second flexible webs that define an interior chamber, and at least one opening that provides access to said chamber;

a storage compartment integrally manufactured as part of said vehicle and adapted to store said container when collapsed; and means for securing said container to said roof when container is extended.

16. The carrier of claim 15 wherein said storage compartment is manufactured as part of a luggage rack of said vehicle.

17. The carrier of claim 15 wherein said storage compartment is manufactured as part of a roof of said vehicle.

* * * * *